(12) United States Patent
Pessiot et al.

(10) Patent No.: US 11,485,690 B2
(45) Date of Patent: Nov. 1, 2022

(54) VALORISATION OF POTASSIUM SALTS COPRODUCED IN FERMENTATION PROCESSES

(71) Applicant: AFYREN, Saint-Beauzire (FR)

(72) Inventors: Jeremy Jean-Paul Pessiot, La Charite sur Loire (FR); Michael Fréderic Pierre Roussel, Clermont-Ferrand (FR); Aurelien Antoine Bost, Clermont-Ferrand (FR)

(73) Assignee: AFYREN, Saint-Beauzire (FR)

( * ) Notice: Subject to any disclaimer, the term of this patent is extended or adjusted under 35 U.S.C. 154(b) by 32 days.

(21) Appl. No.: 16/205,983

(22) Filed: Nov. 30, 2018

(65) Prior Publication Data

US 2019/0169074 A1    Jun. 6, 2019

(30) Foreign Application Priority Data

Nov. 30, 2017  (FR) ...................... 1761410

(51) Int. Cl.
*C05D 1/00* (2006.01)
*C05F 5/00* (2006.01)

(52) U.S. Cl.
CPC ............... *C05D 1/005* (2013.01); *C05D 1/00* (2013.01); *C05F 5/008* (2013.01)

(58) Field of Classification Search
CPC . C05D 1/005; C05D 1/00; C05F 5/008; C05F 5/00; C05F 5/006; C05F 7/00
See application file for complete search history.

(56) References Cited

U.S. PATENT DOCUMENTS

| 3,334,988 | A | | 8/1967 | Newsom | |
|---|---|---|---|---|---|
| 5,177,008 | A | * | 1/1993 | Kampen | ................... C12P 7/46 435/139 |
| 2010/0044306 | A1 | * | 2/2010 | Lo | ........................... C02F 1/722 210/631 |

(Continued)

FOREIGN PATENT DOCUMENTS

| EP | 0350355 A1 | 1/1990 |
|---|---|---|
| EP | 0411780 A2 | 2/1991 |

(Continued)

OTHER PUBLICATIONS

Silva, Gervásio P. da, et al. "Ethanolic fermentation of sucrose, sugarcane juice and molasses by *Escherichia coli* strain KO11 and Klebsiella oxytoca strain P2." Brazilian Journal of Microbiology 36.4 (2005): 395-404.*

(Continued)

*Primary Examiner* — Jennifer A Smith
(74) *Attorney, Agent, or Firm* — BCF LLP

(57) ABSTRACT

The present technology relates to a method for preparing a mixture of solid potassium salts from a fermentation juice from a fermentation process for the production of chemical compounds in a pH-controlled fermentation medium by adding of a base comprising potassium hydroxide. The method comprises adding an acid to the fermentation juice in an amount sufficient to cause the precipitation of the mixture of potassium salts, and then separating the mixture of salts of potassium solid potassium acidified fermentation juice. The present technology also relates to the mixture of potassium salts obtained by said method and its use as fertilizer.

17 Claims, 1 Drawing Sheet

(56) References Cited

U.S. PATENT DOCUMENTS

2012/0210759 A1* 8/2012 Stamatis de Arruda Sampaio ..... C05F 5/008
71/23

FOREIGN PATENT DOCUMENTS

| | | |
|---|---|---|
| EP | 1870474 A1 | 12/2007 |
| FR | 2573088 A1 | 5/1986 |
| KZ | 31348 B | 7/2016 |
| NL | 9200402 | 10/1993 |
| NL | 9200403 | 10/1993 |
| RU | 2275348 C2 | 4/2006 |
| RU | 2598276 C2 | 9/2016 |
| WO | 97/47559 A1 | 12/1997 |
| WO | WO97/47559 A1 | 12/1997 |
| WO | 2010/047815 A2 | 4/2010 |
| WO | 2014/100424 A1 | 6/2014 |
| WO | 2016/012701 A1 | 1/2016 |
| WO | 2016/135396 A1 | 9/2016 |
| WO | 2016/135397 A1 | 9/2016 |
| WO | 2017/013335 A1 | 1/2017 |

OTHER PUBLICATIONS

Sydney, Eduardo Bittencourt. Valorization of vinasse as broth for biological hydrogen and volatile fatty acids production by means of anaerobic bacteria. Diss. Clermont-Ferrand 2, 2013.*
Neulicht, R. "Emission Factor Documentation for AP-42 Section 9.10. 1.1 Sugarcane Processing." Compilation of Air Pollutant Emission Factors (AP-42) (1997): 9.*
Espacenet translation of FR2573088A1 (Year: 1986).*
Wkielab. "Cheap Rotary Evaporator" <https://wkielab.com/cheap-rotary-evaporators/> Aug. 12, 2020 (Year: 2020).*
International Search Report of PCT/EP2018/083122; dated Feb. 20, 2019; Aurelie Cardin.
Da Silva et al. "Ethanolic Fermentation of Sucrose, Sugarcane Juice and Molasses by *Escherichia coli* Strain K011 and Klebsiella Oxytoca Strain P2" XP002788658, Biosciences Information Service, Oct. 2005, Philadelphia, PA, U.S., pp. 395-404.
English Abstract of EP0350355; Retrieved on Mar. 29, 2019; Retrieved from www.worldwide.espacenet.com.
English Abstract of FR2573088; Retrieved on Mar. 29, 2019; Retrieved from www.worldwide.espacenet.com.
Heilongjin University Press, Section II Organic acid fermentation, Published on May 31, 2008, 5 pages.

* cited by examiner

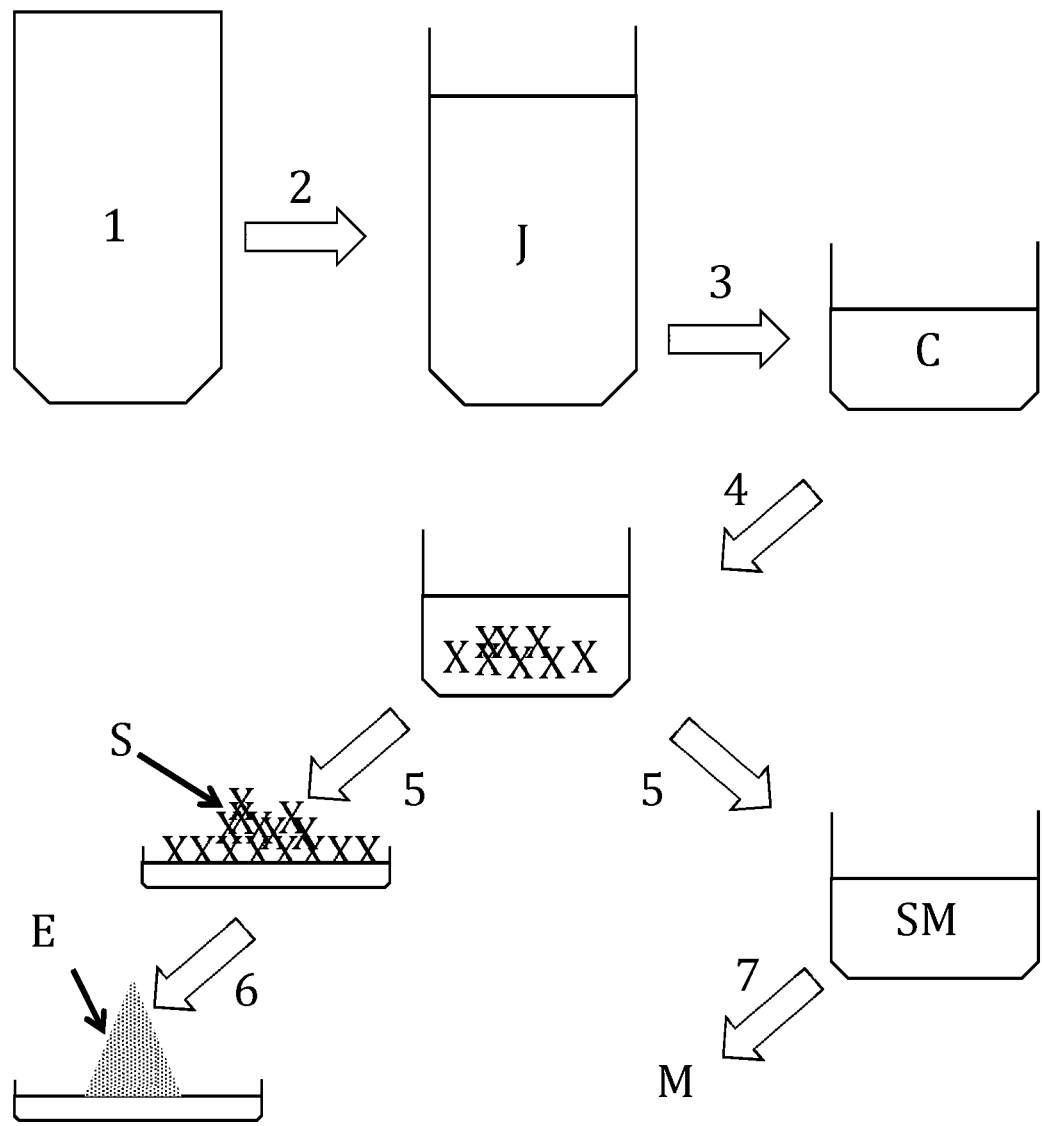

VALORISATION OF POTASSIUM SALTS COPRODUCED IN FERMENTATION PROCESSES

CROSS-REFERENCE TO RELATED APPLICATION

This application claims the benefit of and priority to French patent application No. FR 1761410, filed on Nov. 30, 2017; the content of which is herein incorporated in entirety by reference.

FIELD OF TECHNOLOGY

The present technology generally relates to a method for valorization of potassium salts, in particular potassium salts coproduced in fermentation processes. The present technology also generally relates to a method for producing a mixture of potassium salts as a by-product of a fermentation process via microorganisms. The present technology also generally relates to the mixture of potassium salts obtainable by said process and its use as fertilizer.

BACKGROUND INFORMATION

Many potassium salt fertilizers have been known and used for millennia. Some potassium salts are of natural origin, such as syngenite and arcanite. Syngenite ($K_2Ca(SO_4)_2 \cdot H_2O$) is an uncommon sulphate salt found naturally in the form of druse, marine evaporation deposits, or geothermal field veins. Syngenite can be manufactured industrially by mixing potassium sulphate with calcium sulfate in aqueous phase (U.S. Pat. No. 3,334,988, incorporated herein by reference). Syngenite can be used in combination with struvite-(K) for the preparation of building materials (US 2017/0008804, incorporated herein by reference). Arcanite ($K_2SO_4$) is also a relatively rare mineral of the sulphate family, which is also found as an evaporation deposit in geothermal fields. Arcanite has been described as being able to participate in the preparation of fertilizer, pressed in a mixture with molasses (US 2017/129823, incorporated herein by reference) among other salts such as kieserite ($MgSO_4 \cdot H_2O$), langbeinite ($K_2SO_4 \cdot 2MgSO_4$) and especially polyhalite ($K_2SO_4 \cdot MgSO_4 \cdot 2CaSO_4 \cdot 2H_2O$).

These minerals can be used as fertilizer but their natural, mineral origin, combined with other minerals, such as sodium chloride, requires expensive treatments to make them compatible with agricultural use.

It would therefore be advantageous to find additional sources of sulphate salts that would provide calcium and potassium ions and that would be suitable for use as agricultural fertilizer.

The precipitation of potassium salts at neutral pH by the addition of a base to acidic effluent mixtures of extraction processes of biomass products, in particular from the sugar industry, is described in the state of the art (FR 2,573,088, NL 9,200,402, NL 9,200,403, WO 97/47557, which are all incorporated herein by reference).

Fermentation techniques, via microorganisms for the production of chemicals, especially commodities from biomass are now booming, as an alternative to petrochemical industry. However, methods of treating biomasses to extract the desired products (or "main products") are generating multiple secondary products that it would be advantageous to valorize.

SUMMARY OF TECHNOLOGY

The present technology stems from the discoverers' realization that acid treatment of liquid fractions from a fermentation wort made it possible to precipitatively remove mixtures of potassium salts with high potential for use as fertilizer in agriculture while facilitating the extraction of chemicals produced by the fermentation of biomass.

According to various embodiments, the present technology relates to a method and a process for preparing a mixture of solid potassium salts.

In some implementations of these embodiments, the method comprises adding an acid to a fermentation juice obtained from a fermentation broth. In some instances, the acid is a strong acid. The acid is added in an amount sufficient to cause precipitation of the potassium salt mixture. In some further implementations, the solid potassium salt mixture is separated from the acidified fermentation juice.

According to some embodiments, the present technology is adapted to be implemented on a fermentation process in pH-controlled fermentation medium by the addition of, for example, potassium hydroxyde. In some instances, the present technology is adapted to be implemented in a fermentation process carried out on complex media which are based on fermentable biomass comprising, for example, but not limited to, by-products of the sugar industry such as sugar beet pulp, beet molasses or sugar cane.

In some other instances, the present technology is suitable to be implemented for fermentation liquors of neutral or slightly acidic or basic pH, such as, for example in processes that aim at producing organic acids by fermentation.

In some implementations, the solid potassium salts obtained by the method of the present technology comprises up to 30%, or up to 20% by weight of organic material.

According to various embodiments, the present technology also relates to a mixture of potassium salts obtained by the method defined herein.

According to various embodiments, the present technology further relates to a fertilizer for agriculture. In some implementations of these embodiments, the fertilizer comprises a mixture of potassium salts obtained by the method as defined herein.

According to yet other embodiments, the present technology relates to methods of using a mixture of potassium salts obtained by the method defined herein as a fertilizer in agriculture.

BRIEF DESCRIPTION OF DRAWINGS

All features of embodiments which are described in this disclosure are not mutually exclusive and can be combined with one another. For example, elements of one embodiment can be utilized in the other embodiments without further mention. A detailed description of specific embodiments is provided herein below with reference to the accompanying drawings in which:

FIG. 1 represents a schematic view of a fermentation process for the preparation of a main product with the step of precipitation of the potassium salt mixture according to one embodiment of the present technology. Step 1 is anaerobic fermentation, with the addition of potassium hydroxide to control pH. Step 2 is the separation of solids and liquids to recover the fermentation juice. Step 3 is the concentration step by evaporation of the water in an evaporator. Step 4 is that of the acidification with the addition of concentrated sulfuric acid in the concentrated juice with precipitation of the potassium salts. Step 5 is that of separation of the solid potassium salts (S) from the solution containing the molecules of interest (MS), by decantation/centrifugation. Step 6 is that of drying and grinding the solid potassium salts (S)

to obtain a powdered fertilizer according to the invention (E). Step 7 is that of recovering the molecules of interest (M) from the solution (SM).

DETAILED DESCRIPTION OF TECHNOLOGY

The present technology is explained in greater detail below. This description is not intended to be a detailed catalog of all the different ways in which the technology may be implemented, or all the features that may be added to the instant technology. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure which variations and additions do not depart from the present technology. Hence, the following description is intended to illustrate some particular embodiments of the technology, and not to exhaustively specify all permutations, combinations and variations thereof.

As used herein, the singular form "a," "an" and "the" include plural referents unless the context clearly dictates otherwise.

The recitation herein of numerical ranges by endpoints is intended to include all numbers subsumed within that range (e.g., a recitation of 1 to 5 includes 1, 1.5, 2, 2.75, 3, 3.80, 4, 4.32, and 5).

The term "about" is used herein explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. For example, the term "about" in the context of a given value or range refers to a value or range that is within 20%, preferably within 15%, more preferably within 10%, more preferably within 9%, more preferably within 8%, more preferably within 7%, more preferably within 6%, and more preferably within 5% of the given value or range.

The expression "and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

In one embodiment, the present technology relates to a method for preparing a mixture of solid potassium salts. The method comprises adding an acid to the fermentation juice obtained after clarification of the fermentation broth, in sufficient quantity to precipitate the potassium salt mixture, and separating the mixture of solid potassium salts from the acidified fermentation juice. In some instances, the acid is a strong acid.

In one embodiment, the present technology relates to a process for preparing a mixture of solid potassium salts. The process comprises adding an acid to a fermentation juice from a fermentation broth, in sufficient quantity to precipitate the potassium salt mixture, and separating the mixture of solid potassium salts from the acidified fermentation juice. In some instances, the acid is a strong acid.

Fermentation processes for the production of chemicals, especially commodities, referred to as "main products" or "main product", generally include a fermentation step via microorganisms in a liquid culture medium. In some instances, the liquid culture medium comprises a carbon source suitable for sustaining growth of microorganisms. Microorganisms generate a high density biomass which produces the desired products by consuming the carbon source and other nutrients in the culture medium.

The fermentation juice is generated at the end of the culture by separation of the insoluble particles from the fermentation broth. Methods for separation of such insoluble particles from the fermentation broth are typically carried out by any solid/liquid separation method known and adapted to the culture medium being used, to the culture method as well as to the main products prepared. In some instances the fermentation juice is a fermentation juice that has been clarified by for example, clarification methods. Methods for separation of insoluble particles from fermentation broth are well known to those skilled in the art.

In some instances, the fermentation juice is a solution comprising the main products whose biosynthesis is sought, soluble organic materials, soluble organic or inorganic salts, and potassium ions, or mixtures thereof. In order for the main products to be isolated and purified, the main products are first separated from the soluble materials by techniques well known in the art such as, but not limited to, liquid/liquid extractions, distillation, precipitation or the like.

Addition of an acid in the fermentation juice causes precipitation of potassium salts and organic as well as inorganic materials insoluble at acidic pH, such as, for example, but not limited to, proteins, amino acids, and other organic matter.

In some embodiments, the method of the present technology is suitable for use on a fermentation juice of a fermentation process having main product, or main products that are substantially soluble at acidic pH. In some implementations, the method of the present technology is suitable for recovering co-products of a fermentation process used to produce organic acids as main products.

In some instances, the fermentation juice comprises organic acids as main products of the fermentation process.

The culture media generally comprise macroelements and/or microelements, which are well known to those skilled in the art, which may originate from plants, animals and/or microorganisms such as yeast extracts. These culture media comprise potassium salts. Examples of potassium salts that may be comprised in the culture media include, but are not limited to, $KH_2PO_4$, $K_2HPO_4$, $K_2SO_4$, $KNO_3$, and the like.

The microorganisms may be bacteria, archaebacteria, eukaryotes or mixtures of several microorganisms.

The commodity products prepared are generally low molecular weight organic molecules usually derived from petrochemistry and used as solvents or polymerization monomers, such as organic alcohols, organic acids or amino acids. The products prepared can also be more complex organic molecules, depending on the microorganism used or the mixture of microorganisms used.

Depending on the desired product, the culture can be carried out aerobically, micro-aerobically or anaerobically.

The carbon source can be a simple source, such as, for example, glucose or fructose, assimilated by many microorganisms, or a complex source of fermentable biomass such as by-products of the sugar industry such as sugar beet pulp, molasses of sugar beet or sugar cane, or mixtures thereof in all proportions.

The growth of microorganisms and their consumption of nutrients from the culture medium and generation of the main products can lead to pH variations. In some instances, variations in pH is a decrease in pH (i.e., acidification).

The pH can then be regulated by the addition of a base, in particular potassium hydroxide. It will be appreciated by those of skill in the art that any base comprising essentially potassium hydroxide may be used, including any mineral base used in the field of industrial fermentation, including potash.

The fermentation medium is neutralized and the pH of the fermentation juice is substantially neutral or slightly acidic or slightly basic depending on the amount of base added. In some instance, the pH of the fermentation juice ranges between about 5 to about 9, or ranges between about 6 and about 8, or is at least 6.

The method of the present technology may be implemented on a fermentation method in pH-controlled fermentation medium by the addition of a first base. In some instances, the first base to be added comprises potassium hydroxide. This is particularly the case for processes for preparing organic acids which require neutralization of the acids produced, which are found in solution in the form of potassium salts. In some instances, the organic acids are volatile organic acids. Examples of organic acids include, but are not limited to acetic, butyric, propionic, isobutyric, isovaleric, valeric and caproic acids, and mixtures thereof. In some instances, at least a second base may be added. Examples of second bases that may be added, include, but are not limited to, an ammonium salt.

The potassium in the fermentation juice comes mainly from the potassium hydroxide added during the process to regulate the pH.

According to a first variant of the method according to the present technology, the potassium hydroxide is used alone. According to another variant of the method according to the present technology, the potassium hydroxide is associated with another base, such as ammonia ($NH_4OH$). The addition of ammonia to the potassium hydroxide results in a nitrogen-enriched precipitated salt. In some instances, the precipitated nitrogen-enriched salt may be used as fertilizer.

The method as defined herein is suitable for application to fermentation juice obtained from a fermentation broth.

In some instances, the method as defined herein is suitable for application to fermentation juice obtained from a fermentation broth resulting from a culture process in a liquid medium with a carbon source derived from fermentable biomass. Examples of fermentable biomass from which the fermentable juice may be obtained include, but are not limited to: by-products of the sugar industry, such as sugar beet pulp, sugar beet or sugarcane molasses, mixtures thereof in all proportions, and having a pH regulated by the addition of potassium hydroxide.

In some instances, the method as defined herein is suitable for treatment of fermentation juice of an anaerobic fermentation process in a liquid medium with sugar beet pulp, molasses or mixtures thereof in all proportions. In some instances, the culture medium also comprises vinasse in various proportions to bring the water of the liquid medium. Such methods are known from the state of the art, in particular described in patent applications WO 2016/135396, WO 2016/135397, WO 2016/012701, WO 2017/013335, WO 2015/0536683, WO 2014/100424 and WO 2010/047815, which are all incorporated herein by reference.

The amount of potassium ions in the fermentation juice is between about 0.01 M and about 1 M, or between about 0.05 M and about 0.5 M, or is more than about 0.1 M, or is more than about 0.2 M. Depending on the concentration of potassium ions in the fermentation juice, it will be concentrated according to the usual methods of the skilled person, in particular by evaporation of water.

The method of the present technology allow for the recovery of co-products from fermentation processes, therefore the extent of the concentration and the operating conditions of the method depend on the main products sought, the conditions of valorization of the co-products not significantly interfering with the yield of these main products.

After precipitation, the mixture of potassium salts is separated from the acidified juice, then optionally dried and/or milled, by any usual method known to those skilled in the art, such as by filtration, drying and/or grinding.

According to a particular embodiment, the separation of the solid potassium salt mixture from the acidified fermentation juice is done by drying. The chemical compounds produced by fermentation are entrained with the drying vapors, and then recovered by condensation of said vapors.

In some embodiments, the mixture of precipitated potassium salts comprises: between about 20% and about 70% of potassium ions, or between about 30% and about 60%, between about 5% and about 20% of organic matter, the percentages being given in grams relative to the total weight of the mixture of dried salts. In some implementations, the mixture of precipitated potassium salts comprises up to 30%, or up to 25% of organic matters.

The potassium content is expressed with respect to a content of element K and/or $K_2O$.

The mixture of precipitated potassium salts may also comprise calcium, magnesium and iron ions, and/or traces of arsenic, cadmium, chromium, copper, mercury, molybdenum, nickel, lead, selenium and of zinc.

According to a particular embodiment, the mixture of precipitated potassium salts comprises up to about 10% of calcium, or up to about 7%.

According to another embodiment, the mixture of precipitated potassium slats may comprise at least about 0.0001% of zinc, or at least about 0.0003% of zinc, or up to about 0.005% of zinc, or between about 0.0003% and about 0.003% zinc.

In some other embodiments, the mixture of precipitated potassium salts comprises: between about 20% and about 70% of potassium ions, or between about 30% and about 60%, between about 5% and about 20% organic matter, between about 0% and about 10% of calcium, and between about 0% and about 0.005% of zinc, or between about 0.0003% and about 0.003% of zinc.

In some embodiments, the acid added to the fermentation juice, and more particularly to the concentrated fermentation juice, is a strong acid. Examples of acid that may be added to the fermentation juice include, but are not limited to: sulfuric acid, phosphoric acid, nitric acid, hydrochloric acid and mixtures thereof in all proportions. In some embodiments, the acid added to the fermentation juice is sulfuric acid. Those skilled in the art will be able to choose a sulfuric acid suitable for carrying out their industrial process, generally a sulfuric acid concentrated to more than about 90%, or more than about 95%, or more than about 98%.

The content in sulfur and phosphate in the mixture of precipitated potassium salts will vary depending on the acid employed. Those skilled in the art will be able to determine the quantity of acid necessary for an efficient precipitation in the context of the main product preparation process, so as to avoid affecting the yield and the quality of the main products. In general, one will add the amount of acid necessary to obtain a fermentation juice or of a concentrated fermentation juice, acidified at a pH of less than about 5, or up to about 3 or even less than about 3. In the case where the main products are acids organic, it will be advantageous to acidify the fermentation juice or concentrated fermentation juice, to a pH of less than about 4, or of about 3.

In some other embodiments, the mixture of precipitated potassium salts obtained has the composition (% by weight) identified in Table 1:

TABLE 1

Content of precipitated potassium salt (PPS) according to some embodiments

|  | % (PPS 1) | % (PPS 2) |
| --- | --- | --- |
| Total Nitrogen | 0.5-5 | 1-1.5 |
| Organic Carbon | 1-10 | 5-8 |
| Total $P_2O_5$ | 0.1-5 | 0.3-0.5 |
| Total $K_2O$ | 30-50 | 40-50 |
| Total CaO | 1-10 | 4-7 |
| Total MgO | 0.05-0.5 | 0.15-0.20 |
| Total Sulfates ($SO_3$) | 25-55 | 34-42 |
| Total Zinc | 0.0001-0.005 | 0.0003-0.003 |
| Water | 0-15 | 0-5 |

It will be appreciated that the total content may be different from 100% due to the loss of certain elements to implement the methods of analysis. Those skilled in the art are familiar with the methods for analyzing precipitated salts, in particular the X-ray fluorescence (FX) method or X-ray diffraction (XRD) method. The analysis can be done on the precipitate before or after drying, or after grinding.

A mixture of potassium salts is generally obtained by adding sulfuric acid to the fermentation juice/concentrated fermentation juice of a fermentation process having a pH regulated by the addition of potassium hydroxide. The potassium salts of the mixture comprise arcanite and syngenite. The arcanite/syngeneite weight ratio in the potassium salt mixture can range from about 5/95 to about 70/30. This weight ratio generally depends on the carbon source used. In the case of a complex fermentable biomass source such as sugar beet pulp, the weight ratio is typically between about 5/95 and about 25/75. In the case of a complex fermentable biomass source such as molasses, the weight ratio is typically between about 30/70 and about 70/30.

The method according to the present technology can be implemented on fermentation juices of a single batch of fermentation. The method according to the present technology can be implemented used on a mixture of fermentation juices of several batches of fermentations made under similar or different conditions.

The method of the present technology may be carried out on a mixture of batches of fermentation juices originating from fermentations in a liquid medium with on the one hand molasses of sugar beet or sugar cane as a source of complex carbon and on the other hand sugar beet pulp.

In some instances, the method for preparing mixtures of precipitated potassium salts of the present technology may be carried out at an industrial stage. In fact, the method may be carried out on volumes of fermentation juice that range from hundreds of liters to several thousand cubic meters.

When mixing fermentation juices from several batches, it may be desirable to do so on concentrated juices so as to reduce the volume to be treated as well as associated costs.

The mixture of salts obtained is ground homogeneously for its subsequent uses. The ground material has a particle size of between about 50 μm (microns) and about 400 μm (microns), of between about 100 μm (microns) and about 400 μm (microns). It is understood by these values that at least 80% of the powder passes through a mesh screen compatible with these dimensions.

In some embodiments, the method of the present technology may be suitable for producing organic acids as defined above. Fermentation requires neutralization by adding a base, such as for example: potassium hydroxide or a mixture of potassium hydroxide and ammonia and the fermentation juice has a neutral or slightly acidic or basic pH depending on the amount of base added, for example between about 5 and about 9, or between about 6 and about 8, or of at least about 6. The fermentation juice is then concentrated, whether it comes from a single batch of fermentation or a mixture of several batches and the addition of acid is done in the concentrated juice. Precipitation of potassium salts forms a paste that may be difficult to separate from acidified juice by conventional methods such as filtration.

According to a particular embodiment, the separation is done by drying the mixture of precipitated salts and acidic juice during which the acids are entrained with the vapors. All that remains is to recover the condensed vapors and then isolate and purify the organic acids according to the usual methods for separating the various molecules, in particular by distillation. Those of skill in the art will appreciate the means for condensing vapors as the means of separation of the organic acids best suited to the organic molecules to be isolated. The dried potassium salts are in turn treated for the preparation of a fertilizer according to the usual methods described above.

According to another embodiment, there is provided a method for treatment of a fermentation juice. The fermentation juices comprising salts of organic acids as defined above in the form of potassium salts for the production of organic acids on the one hand and solid potassium salts on the other hand, which comprises adding a strong acid to the fermentation juice in an amount sufficient to cause the precipitation of the potassium salt mixture, and then drying the mixture of precipitated potassium salts to recover, on the one hand, the acids organics entrained with the vapors and secondly the dried potassium salts. The process is carried out on a concentrated fermentation juice comprising between about 0.01 M and about 2 M of acid salts.

The present technology also relates to a mixture of precipitated potassium salts that can be obtained by the process as defined above. The precipitated salt mixture according to the present technology can be formulated for use as a fertilizer in agriculture, used as is or associated with other fertilizers or other crop protection products. The fertilizer mixture can be prepared with a mixture of several precipitated salts according to the present technology from several batches; the mixture can be made before or after drying and/or grinding. For use as a fertilizer, the mixtures of the present technology have a particle size of less than about 315 microns.

The present technology also relates to a method of fertilizing a soil for the cultivation of plants comprising the provision of a fertilizer comprising a mixture of solid potassium salts obtainable by the process as defined above, before, during or after growing plants. Those skilled in the art will be able to identify the usual doses to be used in the fields to supply the necessary and sufficient quantities of potassium with the mixture of precipitated salts according to the present technology.

Identification of equivalent processes and methods are well within the skill of the ordinary practitioner and would require no more than routine experimentation, in light of the teachings of the present disclosure. Practice of the disclosure will be still more fully understood from the following examples, which are presented herein for illustration only and should not be construed as limiting the disclosure in any way.

EXAMPLES

The examples below are given so as to illustrate the practice of various embodiments of the present disclosure. They are not intended to limit or define the entire scope of this disclosure. It should be appreciated that the disclosure is not limited to the particular embodiments described and illustrated herein but includes all modifications and variations falling within the scope of the disclosure as defined in the appended embodiments.

Example 1

In an industrial fermenter we proceed to the anaerobic mesophilic fermentation of organic byproducts derived from sugar confectionery such as molasses of sugar beets. The pH of the fermentation broth is regulated with potassium hydroxide. At the end of the fermentation, the fermentation juice is recovered and concentrated by evaporation. For the recovery and purification of the products of interest, the concentrated fermentation juice is acidified by adding concentrated sulfuric acid to pH 3. The precipitate formed by the addition of this acid is recovered and then dried and milled to obtain a powdered fertilizer of agronomical value. The physicochemical analysis of the main components of the fertilizer obtained is reported in the Table 2. The percentages are the average percentages obtained by the analysis of several products resulting from different fermentation juices.

TABLE 2

Physicochemical properties of main components

|  | Mean | Unit | Variability |
|---|---|---|---|
| Physico-chemical analysis |  |  |  |
| Water content | 9.77 | % | +/−10% |
| Major and minor elements |  |  |  |
| Total Nitrogen | 1.19 | % | +/−10% |
| Organic Carbon | 6.4 | % | +/−10% |
| Fire losses | 13.6 | % | +/−10% |
| Total $P_2O_5$ | 0.41 | % | +/−10% |
| Total $K_2O$ | 33 | % | +/−10% |
| Total CaO | 5.14 | % | +/−10% |
| Total MgO | 0.18 | % | +/−10% |
| Total Sulfates ($SO_3$) | 38 | % | +/−10% |
| Traces Metallic Elements |  |  |  |
| Total Zinc | 0.00205 | % | +/−10% |

The fertilizer is then used in the fields according to the usual methods in agriculture, the nature of the soil and the cultivated variety.

Example 2

In an industrial fermenter we proceed to the mesophilic anaerobic fermentation of organic byproducts derived from the sugar industry: molasses of sugar beets. The pH of the fermentation broth is regulated with potassium hydroxide to neutralize the production of volatile organic acids. After the fermentation, the broth is concentrated to obtain condensates on the one hand and a concentrated neutral pH fermentation juice on the other. This concentrated juice is then acidified by the addition of sulfuric acid to lead to precipitate potassium salts. In order to separate the concentrated liquid phase containing the volatile organic acids and the solid phase consisting mainly of potassium salts, a drying step is carried out at a temperature of 110° C. A dried product consisting of potassium salts for the agricultural fertilizer industry and a liquid phase containing the volatile organic acids is then recovered. These volatile organic acids are finally separated by distillation.

BIBLIOGRAPHIC DATA

FR 2 573 088,
NL 9 200 402,
NL 9 200 403,
WO 97/47557,
WO 2010/047815,
WO 2014/100424,
WO 2015/0536683,
WO 2016/012701,
WO 2016/135396,
WO 2016/135397,
WO 2017/013335.

All documents listed herein are incorporated in their entirety by reference.

The invention claimed is:

1. A method for producing volatile organic acids from a biomass fermentation juice comprising potassium salts of said volatile organic acids, the method comprising the steps of:
   a) fermentation, in an industrial fermentor, of a biomass of by-products from the sugar industry using microorganisms, wherein the pH of the fermentation is regulated by the addition of a base comprising potassium;
   b) separation of the fermentation juice from the biomass, wherein the fermentation juice has a concentration of potassium ions ranging from 0.01 to 1 M;
   c) addition of a strong acid to the fermentation juice of step b) until the pH is below 5 in order to form an acidified fermentation juice having a pH below 5 and to cause precipitation of a potassium salts mixture;
   d) drying the acidified mixture of step c) comprising the precipitated potassium salts and the acidified fermentation juice;
   e) recovering the dried potassium salts mixture of step d); and
   f) recovering evaporated volatile organic acids by condensation of vapors of step d).

2. The method according to claim 1, wherein the by-products of the sugar industry are selected from sugar beet pulp, molasses sugar beet and sugar cane.

3. The method according to claim 1, wherein the potassium ions are found in the fermentation juice in an amount ranging from about 0.05 to about 0.5 M.

4. The method according to claim 1, wherein the potassium ions are found in the fermentation juice in an amount of more than about 0.1 M.

5. The method according to claim 1, wherein the potassium ions are found in the fermentation juice in an amount of more than about 0.2 M.

6. The method according to claim 1, wherein the method further comprises a step of concentrating fermentation juice before separating the precipitated potassium salts mixture from the acidified fermentation juice.

7. The method according to claim 1, wherein the fermentation juice in step b) is a mixture of fermentation juice obtained from more than one batch of fermentation.

8. The method according to claim 1, wherein the volatile organic acids are selected from acetic acid, butyric acid, propionic acid, isobutyric acid, isovaleric acid, valeric acid, caproic acid, and mixtures thereof.

9. The method according to claim 1, wherein the fermentation juice comprises salts of volatile organic acids in an amount of between about 0.01 M and about 2 M.

10. The method according to claim 1, wherein the recovered volatile organic acids are isolated by distillation.

11. The method according to claim 1, wherein the precipitated potassium salt mixture comprises:
Between about 20% and about 70% of $K_2O$, and
Between about 5% and about 30% of organic matter,
the percentages being given in grams relative to the total weight of dried salt mixture.

12. The method according to claim 1, wherein the precipitated potassium salt mixture comprises between about 30% to about 60% $K_2O$.

13. The method according to claim 1, wherein the strong acid is sulfuric acid.

14. The method according to claim 13, wherein the precipitated potassium salt mixture comprises a mixture of arcanite and syngenite, in an arcanite/syngenite weight ratio ranging from about 5/95 and about 70/30.

15. The method according to claim 1, wherein the method further comprises a step of grinding the precipitated potassium salts mixture.

16. The method according to claim 1, wherein said method further comprises a step of concentrating the fermentation juice obtained by separation from the biomass in step b), before acidification in step c).

17. The method according to claim 1, wherein the recovered volatile organic acids are further purified.

* * * * *